(12) United States Patent
Sixt et al.

(10) Patent No.: US 10,030,144 B2
(45) Date of Patent: Jul. 24, 2018

(54) ORGANOPOLYSILOXANE COMPOSITIONS WHICH CAN BE CROSSLINKED BY MEANS OF A CONDENSATION REACTION

(71) Applicant: Wacker Chemie AG, Munich (DE)

(72) Inventors: Torsten Sixt, Mehring (DE); Franz Neuhauser, Geretsberg (AT)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/507,434

(22) PCT Filed: Jan. 18, 2016

(86) PCT No.: PCT/EP2016/050871
§ 371 (c)(1),
(2) Date: Feb. 28, 2017

(87) PCT Pub. No.: WO2016/120106
PCT Pub. Date: Aug. 4, 2016

(65) Prior Publication Data
US 2017/0283559 A1   Oct. 5, 2017

(30) Foreign Application Priority Data

Jan. 28, 2015 (DE) ........................ 10 2015 201 423

(51) Int. Cl.
| | |
|---|---|
| *C08L 83/06* | (2006.01) |
| *C08G 77/18* | (2006.01) |
| *C08K 3/36* | (2006.01) |
| *C08G 77/08* | (2006.01) |
| *C08K 3/30* | (2006.01) |

(52) U.S. Cl.
CPC .............. *C08L 83/06* (2013.01); *C08G 77/08* (2013.01); *C08G 77/18* (2013.01); *C08K 3/36* (2013.01); *C08K 2003/3045* (2013.01); *C08K 2201/019* (2013.01)

(58) Field of Classification Search
CPC ............................................... C08K 2003/3045
USPC ......................................................... 524/588
See application file for complete search history.

(56) References Cited

U.S. PATENT DOCUMENTS

| | | | |
|---|---|---|---|
| 5,938,853 A | 8/1999 | Williams | |
| 7,297,745 B2 | 11/2007 | Amidaiji et al. | |
| 2015/0086785 A1* | 3/2015 | Hawley | C01F 11/46 428/402 |
| 2016/0340548 A1* | 11/2016 | Gubbels | C08L 83/06 |

FOREIGN PATENT DOCUMENTS

| | | |
|---|---|---|
| DE | 3439745 A1 | 5/1985 |
| JP | 10316858 A | 12/1998 |
| JP | 2001139816 A | 5/2001 |
| JP | 200716096 A | 1/2007 |
| WO | 2009/080266 A1 | 7/2009 |
| WO | 2009/080267 A1 | 7/2009 |

\* cited by examiner

*Primary Examiner* — Marc S Zimmer
(74) *Attorney, Agent, or Firm* — Brooks Kushman P.C.

(57) ABSTRACT

Moisture curable elastomer compositions are highly suitable for use as sealants, and initially contain an organopolysiloxane having condensable groups, a tri-acyloxy functional organosilicon compound, and as fillers, anhydrite and silica. The compositions have very low modulus and accommodate high joint movement, while being storage stable.

9 Claims, No Drawings

ORGANOPOLYSILOXANE COMPOSITIONS WHICH CAN BE CROSSLINKED BY MEANS OF A CONDENSATION REACTION

CROSS REFERENCE TO RELATED APPLICATIONS

This application is the U.S. National Phase of PCT Appln. No. PCT/EP2016/050871 filed Jan. 18, 2016, which claims priority to German Application No. 10 2015 201 423.1 filed Jan. 28, 2015, the disclosures of which are incorporated in their entirety by reference herein.

BACKGROUND OF THE INVENTION

1. Field of the Invention

The invention relates to organopolysiloxane compositions crosslinkable by condensation reaction, more particularly to one-component, filler-containing organopolysiloxane compositions which crosslink under the influence of moisture and which crosslink to elastomers with elimination of carboxylic acids such as acetic acid.

2. Description of the Related Art

One-component silicone rubber mixtures which undergo vulcanization to elastomers at room temperature (RTV1 compositions) on ingress of water, and which are storable in the absence of water, are known. These products are used in large quantities, for example, as joint-sealing compositions in the construction industry. The profile of properties requires a multitude of product features for the particular end use that are necessary, in order that the paste can be processed effectively, for rapid and complete curing, and for its function to be fulfilled durably in the vulcanized state.

The basis of these RTV1 mixtures are polydiorganosiloxanes, terminated either with OH groups or with silyl groups which carry hydrolyzable groups. Through the chain length of the polymers and through the fillers used it is possible to exert influence over key properties of the RTV1 mixtures. In sealing applications where the elastic joint is subject to considerable movement, accommodation of movement, in particular, is an important parameter. For the durable fulfillment of function, it is necessary that this ability to accommodate movement remains stable—it must not, for example, go down as a result of severe shrinkage.

Influencing variables for the accommodation of movement are, in particular, the chain lengths of the polymers and the fillers used. Greater chain length enhances accommodation of movement; reinforcing fillers lower it in conjunction with an increasing modulus. For economic and technical reasons, however, only a limited range of polymer chain lengths are available for the production of RTV1 mixtures. Greater chain lengths lead to very high viscosities of the polymers, and so the application-ready products are more difficult to process on account of the viscosity, which is high. Compensating for this high viscosity by means of plasticizers leads to increased volatility, and therefore to a greater loss of weight, with adverse consequences for the fulfillment of function, particularly with regard to the requirement of high accommodation of movement. Consequently, fillers offer one option for adjusting the properties. There are, however, certain restrictions on the selection of the fillers, especially in the case of preparations which crosslink with elimination of carboxylic acids, such as acetic acid.

For example, JP 10-316858 and U.S. Pat. No. 5,938,853 A describe the use of coated chalks in order to prevent the release of $CO_2$ due to the reaction with the acetic acid eliminated from the acetoxysilanes with the carbonate. As a result of working in a mixer or kneading apparatus, however, the coating may be damaged, and there is release of $CO_2$, leading to the inflation of cartridges.

DE 34 39 745 A1 describes, alternatively, the use of silicates which have been surface-pretreated beforehand. Silicates are slightly reinforcing fillers, resulting in increasing modulus and falling declining accommodation of movement.

The use of kaolin as a filler for acetic compositions is described in WO 2009/080266 AI. Here again, there is a considerable increase in the modulus of the sealants, leading to increased flank exposure in joint applications. High accommodation of movement is therefore likewise not realizable.

Further fillers which are compatible with acetic compositions, such as quartz powders, for example, likewise result in low accommodation of movement.

SUMMARY OF THE INVENTION

It is an object of the invention to provide organopolysiloxane compositions which crosslink to elastomers with elimination of carboxylic acids such as acetic acid, with the elastomers exhibiting high accommodation of movement, and with the organopolysiloxane compositions, moreover, exhibiting high storage stability, having good processing qualities, exhibiting low shrinkage, and displaying good wetting behavior. These and other objects are surprisingly and unexpectedly achieved by the invention by use of anhydrite and silica as filler, the composition being free of kaolin.

DETAILED DESCRIPTION OF THE PREFERRED EMBODIMENTS

Accommodation of movement is to be understood as the compliance with and classification of a sealant into a class according to ASTM C 920 Chapter 4 that forms the basis for the ASTM C 719 measurement (Test Method for Adhesion and Cohesion of Elastomeric Joint Sealants under Cyclic Movement, "Hockman Cycle").

The subject invention is thus directed to organopolysiloxane compositions crosslinkable by condensation reaction and producible using (1) organopolysiloxanes containing condensable end groups,
(2) organosilicon compounds containing at least three acyloxy groups bonded directly to silicon,
(3) condensation catalysts,
(4) anhydrite, and
(5) silicas, in amounts of at least 1 and not more than 15 parts by weight, preferably not more than 10 parts by weight, based in each case on 100 parts by weight of organopolysiloxanes (1), with the proviso that (6) no kaolin is used,
(7) further fillers are used in amounts of at most 25 parts by weight, preferably at most 15 parts by weight, more preferably at most 5 parts by weight, based in each case on 100 parts by weight of organopolysiloxanes (1), and
(8) optionally further substances, which are used customarily in compositions crosslinkable by condensation reaction and which are different from the constituents (1) to (7).

Organopolysiloxanes (1) which contain condensable end groups are preferably those of the formula $$HO(R_2SiO)_nH \tag{I},$$

where

R may be identical or different and is a monovalent, optionally substituted hydrocarbon radical and n is an integer from 500 to 2000, preferably from 600 to 1700, and most preferably from 600 to 1300.

It is possible to use one kind of organopolysiloxane (1) or a mixture of at least two kinds of organopolysiloxanes (1).

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals, such as the 2,2,4-trimethylpentyl radical, nonyl radicals such as the n-nonyl radical, decyl radicals such as the n-decyl radical, and dodecyl radicals such as the n-dodecyl radical; cycloalkyl radicals such as the cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radicals; aryl radicals such as the phenyl radical; alkaryl radicals, such as o-, m-, and p-tolyl radicals; and aralkyl radicals, such as the benzyl radical and the α- and the β-phenylethyl radicals.

Examples of substituted radicals R are haloalkyl radicals, such as the 3,3,3-trifluoro-n-propyl radical, the 2,2,2,2'',2'', 2'-hexafluoroisopropyl radical, the heptafluoroisopropyl radical, the chloromethyl radical, and haloaryl radicals such as the o-, m-, and p-chlorophenyl radicals, and also all radicals identified above which may be substituted by epoxy-functional groups, carboxyl groups, enamine groups, amino groups, aminoethylamino groups, aryloxy groups, acryloyloxy groups, methacryloyloxy groups, hydroxyl groups, and halogen.

The radical R preferably comprises monovalent hydrocarbyl radicals having 1 to 18 carbon atoms, which are optionally substituted by halogen atoms, amino groups, ether groups, ester groups, epoxy groups, mercapto groups or (poly)glycol radicals, the (poly)glycol radicals being constructed more particularly of oxyethylene and/or oxypropylene units. With particular preference the radical R comprises alkyl radicals having 1 to 12 carbon atoms, more particularly the methyl radical.

The organopolysiloxanes (1) preferably comprise α,ω-dihydroxydialkylpolysiloxanes, more preferably α,ω-dihydroxypolydimethylsiloxanes.

Examples of organopolysiloxanes (1) are (HO)M$_2$SiO [SiM$_2$O]$_x$SiM$_2$(OH), (HO)M$_2$SiO[SiM$_2$O]$_x$[SiMePhO]$_y$ SiM$_2$(OH), where Me is methyl radical and Ph is phenyl radical, it being possible for the individual units to be distributed randomly in the molecule, where x is a number from 500 to 2000, preferably 600 to 1700, more preferably 600 to 1300, and y is a number such that y/x is preferably 0.01 to 0.1.

The inventively employed organopolysiloxanes (1) preferably have a viscosity of 10,000 to 700,000 mPa·s, more preferably of 20,000 to 400,000 mPa·s, and most preferably 50,000 to 200,000 mPa·s, in each case at 25° C.

The organopolysiloxanes (1) are commercial products and/or may be produced by methods which are commonplace within silicon chemistry.

As organosilicon compounds (2) containing at least three acyloxy groups bonded directly to silicon, preference is given to using acyloxy-functional silanes of the formula $$R^1_d Si(OC(=O)R^2)_{4-d} \quad (II)$$

and/or their partial hydrolysates having up to 10 silicon atoms, where

R$^1$ may be identical or different and is a monovalent, optionally substituted hydrocarbyl radical, R$^2$ may be identical or different and is a monovalent, optionally substituted hydrocarbyl radical, and d is 1;

examples of radicals R are as defined for radicals R$^1$.

The radical R$^1$ is preferably a hydrocarbyl radical having 1 to 6 carbon atoms, more preferably a methyl, ethyl, propyl, vinyl or phenyl radical.

Examples of radicals R are as defined for radicals R$^2$.

The radical R$^2$ is preferably a hydrocarbyl radical having 1 to 6 carbon atoms, more preferably the methyl, ethyl, propyl, vinyl or phenyl radical, and most preferably the methyl radical.

Organosilicon compounds (2) containing acyloxy groups are preferably used in amounts of 5 to 20 parts by weight, more preferably 8 to 15 parts by weight, based in each case on 100 parts by weight of organopolysiloxanes (1).

It is possible to use one kind of organosilicon compound (2) or a mixture of at least two kinds of organosilicon compounds (2).

In place of the organopolysiloxanes of the formula (I) it is also possible to use those organopolysiloxanes (1') which are producible by reaction of organopolysiloxanes (1) having condensable end groups with organosilicon compounds (2) having acyloxy groups, optionally in the presence of condensation catalysts (3). Preferred in this case are those of the formula

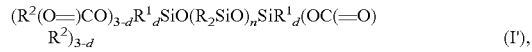

where R, R$^1$, R$^2$, d, and n have the definition stated for them above.

The organopolysiloxanes (1') here preferably have a total Si-bonded acyloxy group content of 1200 to 6000 ppm by weight, more preferably of 1500 to 5000 ppm by weight, and most preferably 1800 to 4000 ppm by weight, with R$^2$ having the aforementioned definition.

The organopolysiloxanes (1) or (1') used in accordance with the invention are preferably liquid at room temperature (25° C.) under the pressure of the surrounding atmosphere, i.e., at between 900 and 1100 hPa.

Condensation catalysts (3) used may be tin-free condensation catalysts (3a) or tin-containing condensation catalysts (3b).

Examples of tin-free condensation catalysts (3a) are organic compounds of zinc, zirconium, titanium, bismuth, strontium, iron, and aluminum. Preferred among these condensation catalysts are alkyl titanates, titanium chelates, and carboxylates of bismuth, strontium, and zinc.

Examples of tin-containing condensation catalysts (3b) are organotin compounds such as di-n-butyltin diacetate, di-n-butyltin dilaurate, di-n-octyltin diacetate, di-n-octyltin dilaurate, and reaction products of alkoxy group-containing silanes or their oligomers with diorganotin diacylates or diorganotin oxides.

Where tin-free condensation catalysts (3a) are used, they are preferably employed in amounts of 50 to 5000 wt. ppm, more preferably 100 to 4000 wt. ppm, and most preferably 200 to 3000 wt. ppm, in each case calculated as elemental metal and based in each case on the total weight of organopolysiloxanes (1).

Where tin-containing condensation catalysts (3b) are used, they are employed in amounts of preferably 10 to 500 wt. ppm, more preferably 20 to 250 wt. ppm, in each case calculated as elemental tin metal and based in each case on the total weight of organopolysiloxanes (1).

Inventively employed anhydrite (4) is preferably used in amounts of 30 to 200 parts by weight, more preferably 50 to 150 parts by weight, and most preferably 70 to 125 parts by weight, based in each case on 100 parts by weight of organopolysiloxane (1).

Anhydrite is a calcium sulfate with up to 0.5 moles of water of hydration, i.e., $CaSO_4.z\ H_2O$ with $0<z<0.5$, in contradistinction, for example, to gypsum, which is a calcium sulfate having 2 moles of water of hydration, i.e., $CaSO_4.2H_2O$. Corresponding anhydrites are available commercially in the form of Anhydrite Super (from Caltra, Mijdrecht, the Netherlands) or Krone HEF (Hilfiger Gipswerke, Osterode, Germany).

Inventively employed silicas (5) used are preferably silicas produced pyrogenically.

The inventively employed silicas (5) preferably have a specific BET surface area of 30 to 500 $m^2/g$, more preferably 100 to 300 $m^2/g$. The BET surface area is measured by known methods; in one preferred version, the specific surface area is measured as BET surface area by means of nitrogen, $BET-N_2$, at the boiling temperature of liquid nitrogen, preferably in accordance with Deutsche Industrie Norm DIN 66131 and DIN 66132.

In the case of the organopolysiloxane compositions of the invention, further fillers (7) may be used. Examples of further fillers (7) are nonreinforcing fillers, i.e., fillers having a BET surface area of up to 50 $m^2/g$, such as quartz, diatomaceous earth, calcium silicate, zirconium silicate, zeolites, metal oxide powders, such as aluminum, titanium, iron or zinc oxides and/or their mixed oxides, barium sulfate, talc, silicon nitride, silicon carbide, boron nitride, glass powders and plastics powders, such as polyacrylonitrile powders; and reinforcing fillers, i.e., fillers having a BET surface area of more than 50 $m^2/g$, such as carbon blacks, examples being furnace black and acetylene black, and mixed silicon-aluminum oxides of high BET surface area; fillers in fiber form, such as asbestos and also plastics fibers. The stated fillers may have been hydrophobized, by treatment, for example, with organosilanes and/or organosiloxanes, or by etherification of hydroxyl groups to alkoxy groups. If further fillers (7) are used, they are preferably talc, carbon black or silicates which do not belong to the group of the kaolins.

With preference no further fillers (7) are used.

In addition to the constituents (1), (2), (3), (4), (5), and (7), the compositions of the invention may optionally comprise further substances (8) which are useful in compositions crosslinkable by condensation reaction and which are different from constituents (1) to (7). Preferred examples of further substances (8) are plasticizers, fungicides, adhesion promoters, rheological additives, and pigments, and mixtures thereof.

Examples of plasticizers are hydrocarbon mixtures having a kinematic viscosity of less than 7 $mm^2/s$ at 40° C., and diorganopolysiloxanes endblocked by triorganosiloxy groups, such as dimethylpolysiloxanes endblocked by trimethylsiloxy groups, preferably having a viscosity of 10 to 10,000 mPa·s at 25° C. If plasticizers are used, they are preferably employed in amounts of not more than 35 parts by weight, more preferably not more than 25 parts by weight, based in each case on 100 parts by weight of organopolysiloxanes (1).

Examples of fungicides are tebuconazole, propiconazole, thiabendazole, carbendazim, butylbenzisothiazolinone, dijodomethyl tolyl sulfone, dichlorooctylisothiazolinone, octylisothiazolinone, and zinc pyrithione.

If fungicides are used, they are preferably employed in amounts of not more than 2000 wt. ppm, based on the total weight of the organopolysiloxanes (1).

Examples of adhesion promoters are glycidyloxypropyltrimethoxysilane, glycidyloxypropyltriethoxysilane, glycidyloxypropylmethyldimethoxysilane, glycidyloxypropylmethyldiethoxysilane, dibutoxydiacetoxysilane, methacryloyloxypropyltrimethoxysilane, methacryloyloxypropyltriethoxysilane, methacryloyloxypropylmethyldimethoxysilane, methacryloyloxypropylmethyldiethoxysilane, methacryloyloxypropyltriacetoxysilane, and methacryloyloxypropylmethyldiacetoxysilane.

If adhesion promoters are used, they are preferably employed in amounts of not more than 2.5 parts by weight, based on 100 parts by weight of the organopolysiloxanes (1).

Examples of rheological additives are treated or untreated castor oils, polyethylene oxides or polypropylene oxides or copolymers thereof, optionally with siloxane units.

If rheological additives are used, they are preferably employed in amounts of not more than 1 part by weight, based on 100 parts by weight of the organopolysiloxanes (1).

Examples of pigments are titanium dioxide, carbon black, metal oxides, metal sulfides, organic pigments or mineral pigments such as spinels, for example.

If pigments are used, they are preferably employed in amounts of not more than 2.5 parts by weight, based on 100 parts by weight of the organopolysiloxanes (1).

In one preferred variant version, the organopolysiloxane compositions of the invention are produced using
(1) organopolysiloxanes
(2) acyloxysilanes and/or their partial hydrolysates,
(3) organotin compounds as condensation catalyst,
(4) anhydrite, and
(5) pyrogenic silica.

In another preferred variant version, the organopolysiloxane compositions of the invention are produced using
(1) organopolysiloxanes,
(2) acyloxysilanes and/or their partial hydrolysates,
(3) organotin compounds as condensation catalyst,
(4) anhydrite,
(5) pyrogenic silica, and
(8) plasticizer.

In another preferred variant version, the organopolysiloxane compositions of the invention are produced using
(1) organopolysiloxanes,
(2) acyloxysilanes and/or their partial hydrolysates,
(3) organotin compounds as condensation catalyst,
(4) anhydrite,
(5) pyrogenic silica, and
(8) plasticizer based on hydrocarbon mixtures and fungicide.

In another preferred variant version, the organopolysiloxane compositions of the invention are produced using
(1) organopolysiloxanes,
(2) acyloxysilanes and/or their partial hydrolysates,
(3) strontium carboxylate as condensation catalyst,
(4) anhydrite,
(5) pyrogenic silica, and
(8) plasticizer.

In another preferred variant version, the organopolysiloxane compositions of the invention are produced using
(1) organopolysiloxanes,
(2) acyloxysilanes and/or their partial hydrolysates,
(3) zinc carboxylate as condensation catalyst,
(4) anhydrite,
(5) pyrogenic silica, and
(8) plasticizer.

In another preferred variant version, the organopolysiloxane compositions of the invention are produced using
(1) organopolysiloxanes,
(2) acyloxysilanes and/or their partial hydrolysates,
(3) titanium chelate as condensation catalyst,
(4) anhydrite,
(5) pyrogenic silica, and
(8) plasticizer.

For producing the compositions of the invention, all of the constituents of the respective composition can be mixed with one another in any order. This mixing preferably takes place at room temperature under the pressure of the surrounding atmosphere, in other words about 900 to 1100 hPa, and preferably the ingress of water is avoided in the course of this mixing. If desired, however, this mixing may also take place at higher temperatures, such as at a temperature in the range from 25 to 80° C.

The normal water content of the air is sufficient for crosslinking the compositions of the invention. The crosslinking of the compositions of the invention preferably takes place at room temperature. The crosslinking can, if desired, also be carried out at temperatures higher or lower than room temperature, for example at −5° to 15° C. or at 30° to 50° C. Crosslinking may also be carried out at water concentrations which exceed the normal water content of the air.

The crosslinking is preferably carried out preferably under a pressure of 100 to 1100 hPa, more particularly under the pressure of the surrounding atmosphere.

A further subject of the present invention are moldings produced by crosslinking the compositions of the invention.

The elastomers of the invention to which the compositions of the invention crosslink have the advantage that they have high accommodation of movement.

The elastomers of the invention to which the compositions of the invention crosslink have the further advantage that they have a modulus of elasticity of less than 0.45 N/mm².

Surprisingly, in spite of high filler content on the part of the compositions of the invention, elastomers are obtained that have high accommodation of movement and low modulus.

The compositions of the invention have the further advantage that they exhibit good storage stability and low shrinkage.

The compositions of the invention can be used for all applications for which it is possible to use compositions which are storable in the absence of water and which on ingress of water crosslink at room temperature to form elastomers.

The compositions of the invention are suitable as elastic adhesives or sealants, for the sealing of joints, gaps or junctions, for example in the sanitary sector, window construction, glazing, with building materials, construction elements, automobiles, rail vehicles, aircraft, boats, household appliances, and machines.

EXAMPLES

In the examples described below, all viscosity figures are based on a temperature of 25° C. Unless otherwise indicated, the examples below are conducted under the pressure of the surrounding atmosphere, i.e., approximately at 1000 hPa, and at room temperature, i.e. at approximately 23° C., or at a temperature which comes about when the reactants are combined at room temperature without additional heating or cooling, and also at a relative atmospheric humidity of approximately 50%. Furthermore, all data in parts and percentages, unless otherwise indicated, are by weight.

For the purposes of the present invention, the viscosities are determined as follows:

The measurements of the dynamic viscosity of the organopolysiloxanes are based on DIN 53019-1 on a plate/cone rotational viscometer featuring a cone with a diameter of 50 mm and a cone angle of 2°, at 25° C. with a shear rate of 1 1/s to 10 1/s. Evaluation takes place via linear regression in the linear range.

The viscosity figures and paste properties of the crosslinkable compositions of the invention are based on measurement in accordance with DIN 54458 by means of the amplitude sweep. Measurement takes place via a plate/plate arrangement with a cone 25 mm in diameter and with 0.5 mm distance at a circular frequency of 10 Hz.

Viscosity $\eta^*(\gamma=0.1\%)$: corresponds to the complex viscosity value [mPa*s] at a deformation of 0.1% according to DIN 54458. Viscosity $\eta^*(\gamma=100\%)$: corresponds to the complex viscosity value [mPa*s] at a deformation of 100% according to DIN 54458.

Yield point: corresponds to the shear stress [Pa] at the point at which the ratio of loss modulus to storage modulus is equal to 1.

The weight-average molar mass $M_w$ and number-average molar mass $M_n$ are determined in the context of the present invention by Size Exclusion Chromatography (SEC) against polystyrene standard, in THF, at 60° C., flow rate 1.2 ml/min and detection with RI (refractive index) detector on a Styragel HR3-HR4-HR5-HR5 column set from Waters Corp. USA with an injection volume of 100 μl.

The skin-forming time is defined as the time after which there is no longer any adhering residue of a delivered string of silicone to a pencil of hardness HB with which it is contacted.

The early strength is determined by applying a strip of silicone 10 mm wide and 6 mm in height to a plate of aluminum 0.25 mm thick, using a doctor blade, then bending one specimen in each case by 90° at 30-minute intervals. The early strength reported is the time required for the silicone strip to no longer exhibit any tear.

The Shore A hardness is determined according to DIN 53505-87 (DIN=Deutsche Industrie Norm).

The elongation at break, tensile strength, and strain at 100% elongation are determined in accordance with DIN 53504-85 S2.

The 100% strain figure corresponds to the secant modulus at an elongation of 100%.

Hardness, elongation at break, 100% strain value, and tensile strength after climatic stress storage at 7d/70° C./95% relative atmospheric humidity are determined according to DIN 53505-87 and DIN 53504-85 S2, respectively, with the specimens initially vulcanizing for 14 days at 23° C./50% relative atmospheric humidity and then being stored in a climate cabinet for 7 days at 70° C. and 95% relative atmospheric humidity. After a rest time of 1 hour in the 23° C./50% relative atmospheric humidity standard conditions, the specimens are measured as prescribed in the standards.

The accommodation of movement is tested in compliance with standard ASTM C719, by cleaning aluminum supports (76.2 mm×25.4 mm×6.4 mm, from Rocholl, 6016) with methyl ethyl ketone and pretreating them with primer G 791 (Wacker Chemie AG). After 24 hours, the specimens are produced, with the sealant being introduced in the required manner between two aluminum supports, and the specimens are further conditioned according to ASTM C719 and subjected to measurement; classification takes place according to ASTM C 920, chapter 4.

Inventive Example 1

100 parts of an α,ω-dihydroxydimethylpolysiloxane having a viscosity of 80,000 mPa·s (OH content 470 wt. ppm) are mixed with 20 parts of a trimethylsilyl-endblocked polydimethylsiloxane having a viscosity of 100 mPa·s, and the mixture is then homogenized with 90 parts of HEF anhydrite from Krone. Subsequently 11 parts of an acetoxysilane mixture (70 wt % ethyltrisacetoxysilane and 30 wt % methyltrisacetoxysilane) are added and the mixture is homogenized. Subsequently 9 parts of a pyrogenic silica having a BET surface area of 150 m²/g are mixed in homogeneously and 0.04 part of di-n-butyltin diacetate is added. The mixture is devolatilized under a pressure of 100 mbar for 5 minutes.

Inventive Example 2

100 parts of an α,ω-dihydroxydimethylpolysiloxane having a viscosity of 80,000 mPa·s (OH content 470 wt. ppm) are mixed with 20 parts of a trimethylsilyl-endblocked polydimethylsiloxane having a viscosity of 100 mPa·s, and the mixture is then homogenized with 90 parts of HEF anhydrite from Krone. Subsequently 11 parts of an acetoxysilane mixture (70 wt % ethyltrisacetoxysilane and 30 wt % methyltrisacetoxysilane) are added and the mixture is homogenized. Subsequently 9 parts of a pyrogenic silica having a BET surface area of 150 m²/g are mixed in homogeneously and 2 parts of Oktasoligen Strontium 10 from OMG are added. The mixture is devolatilized under a pressure of 100 mbar for 5 minutes.

Comparative Example 1

100 parts of an α,ω-dihydroxydimethylpolysiloxane having a viscosity of 80,000 mPa·s (OH content 470 wt. ppm) are mixed with 20 parts of a trimethylsilyl-endblocked polydimethylsiloxane having a viscosity of 100 mPa·s, and then 90 parts of talc 2/0 from Novotalk are mixed in. Subsequently 11 parts of an acetoxysilane mixture (70 wt % ethyltrisacetoxysilane and 30 wt % methyltrisacetoxysilane) are added and the mixture is homogenized. Subsequently 9 parts of a pyrogenic silica having a BET surface area of 150 m²/g are mixed in homogeneously, and 0.04 part of di-n-butyltin diacetate is added. The mixture is devolatilized under a pressure of 100 mbar for 5 minutes.

Comparative Example 2

100 parts of an α,ω-dihydroxydimethylpolysiloxane having a viscosity of 80,000 mPa·s (OH content 470 wt. ppm) are mixed with 20 parts of a trimethylsilyl-endblocked polydimethylsiloxane having a viscosity of 100 mPa·s, and then homogenized with 90 parts of Polestar 200 from Imerys (kaolin). Subsequently 11 parts of an acetoxysilane mixture (70 wt % ethyltrisacetoxysilane and 30 wt % methyltrisacetoxysilane) are added and the mixture is homogenized. Subsequently 9 parts of a pyrogenic silica having a BET surface area of 150 m²/g are mixed in homogeneously, and 0.04 part of di-n-butyltin diacetate is mixed in. The mixture is devolatilized under a pressure of 100 mbar for 5 minutes.

The product properties are summarized in the table.

TABLE

| | | Inventive example or comparative experiment | | | |
|---|---|---|---|---|---|
| | | 1 | 2 | C1 | C2 |
| Viscosity η* (γ = 0.1%) | [mPa · s] | 571,000 | 633,000 | 513,000 | 665,000 |
| Viscosity η* (γ = 100%) | [mPa · s] | 112,000 | 106,000 | 83,400 | 75,500 |
| Yield point | [Pa · s] | 623 | 778 | 622 | 529 |
| Skin-forming time | [min] | 20 | 30 | 17 | 13 |
| Shore A hardness | | 28 | 23 | 29 | 35 |
| Elongation at break | [%] | 670 | 800 | 530 | 320 |
| Tensile strength | [N/mm²] | 1.2 | 1.2 | 1.4 | 2.7 |
| 100% strain value | [N/mm²] | 0.43 | 0.36 | 0.57 | 1.18 |
| LM classification | | yes | yes | no | no |
| Accommodation of movement as per ASTM C719* | 25% | x | x | x | — |
| | 40% | x | x | — | — |
| | 50% | — | x | — | — |
| Paste storage 56 d at 50° C. | | | | | |
| Skin-forming time | [min] | 27 | 28 | 23 | 19 |
| Shore A hardness | | 22 | 38 | 27 | 22 |
| Elongation at break | [%] | 710 | 830 | 480 | 400 |
| Tensile strength | [N/mm²] | 1.2 | 1.1 | 1.2 | 1.5 |
| 100% strain value | [N/mm²] | 0.40 | 0.30 | 0.55 | 0.49 |

*complies (x); does not comply (—)

The inventive examples exhibit surprisingly high accommodation of movement of greater than or equal to 40% according to ASTM C719. In contrast to the comparative examples with talc and kaolin, the inventive examples have a modulus of elasticity of less than 0.45 N/mm² and are therefore classed as "low modulus" products (classification according to ISO 11600).

In the accelerated aging test over 8 weeks (56d) at 50° C., the inventive compositions exhibit virtually no change in behavior. By comparison with this, the kaolin-filled compositions are not storage stable; hardness and modulus suffer severely on accelerated paste storage at 50° C. Talc-filled compositions are storage-stable, but achieve only relatively low accommodation of movement and do not attain the class of the "low modulus" products according to ISO 11600.

In spite of high filling levels, the products are readily applicable from the cartridge and have good processing behavior in terms of extrusion rate and stringing.

The invention claimed is:

1. An organopolysiloxane composition crosslinkable by condensation reaction, and produced from a composition comprising:
   (1) at least one organopolysiloxane containing condensable end groups,
   (2) at least one organosilicon compound containing at least three acyloxy groups bonded directly to silicon,
   (3) one or more condensation catalysts,
   (4) anhydrite, and
   (5) silica, in amounts of at least 1 and not more than 15 parts by weight, based on 100 parts by weight of organopolysiloxane (1), with the proviso that
   (6) no kaolin is used,
   (7) any further fillers are used in amounts of at most 25 parts by weight based on 100 parts by weight of organopolysiloxanes (1), and
   (8) optionally further substances, useful in compositions crosslinkable by condensation reaction and which are different from the constituents (1) to (7).

2. The organopolysiloxane composition of claim 1, wherein silica is present in amounts of at least 1 and not more than 10 parts by weight, based on 100 parts by weight of organopolysiloxane (1).

3. The organopolysiloxane composition of claim 1, wherein silica is present in amounts of at least 1 and not more than 15 parts by weight, based on 100 parts by weight of organopolysiloxane (1), and any further fillers are used in amounts of at most 15 parts by weight based on 100 parts by weight of organopolysiloxanes (1).

4. An organopolysiloxane composition of claim 1, wherein silica is present in amounts of at least 1 and not more than 15 parts by weight, based on 100 parts by weight, and any further fillers are used in amounts of at most 5 parts by weight based on 100 parts by weight of organopolysiloxanes (1).

5. The organopolysiloxane composition of claim 1, wherein condensation catalysts (3) comprise tin-free condensation catalysts.

6. The organopolysiloxane composition of claim 1, wherein no further fillers (7) are pesent.

7. The organopolysiloxane composition of claim 1, wherein further substances (8) are present, and comprise one or more substances selected from the group consisting of plasticizers, fungicides, adhesion promoters, rheological additives, pigments, and mixtures thereof.

8. A method for producing the composition of claim 1, comprising mixing all of the constituents in any order.

9. A molding produced by crosslinking a composition of claim 1.

* * * * *